Patented July 16, 1935

2,008,584

UNITED STATES PATENT OFFICE 2,008,584

PROCESS OF TREATING DISTILLERY SLOP

Harold L. King, Bloomfield, N. J., assignor to National Grain Yeast Corporation, Belleville, N. J., a corporation of New Jersey No Drawing. Application February 4, 1931, Serial No. 513,460

7 Claims. (Cl. 195—20)

My invention is a process of treating waste distillery slop, to render the same available as a constituent of the nutrient medium for the propagation of commercial compressed yeast, and a nutrient medium for the propagation of commercial compressed yeast.

Distillery slop, obtained from the alcoholic fermentation of beet molasses, or blackstrap molasses, has long been regarded as a waste product. This waste product, in the operation of large plants, presents serious difficulties in connection with its disposal. Due to its characteristic odor, it is frequently impossible to discharge the same into the ordinary sewage system of a town or city, and separate sewage systems have been built for its disposal, at a large cost. Attempts have been made to utilize this product in the production of fertilizer, by incinerating the same for obtaining the potassium content, but such method is not economical or profitable. As far as I am aware, no successful profitable method has been devised for utilizing this waste distillery slop.

I have discovered that the waste distillery slop, when properly treated in accordance with my method, may be successfully used as a constituent of a nutrient medium for the propagation of yeast.

When a regular molasses mash of high gravity (22° to 25° Balling) is fermented for the production of commercial alcohol, the yeast present functions chiefly to split up the inverted sugars into ethyl alcohol and carbon dioxide gas. Due to the almost complete exclusion of oxygen, especially after fermentation has set in vigorously, there is only a very slight propagation of yeast cells and, consequently, very little assimulation by the yeast cells, of the large amount of nitrogen matter and dissolved mineral substances present in the mash. This is due to the fact that yeast cannot assimilate the substances necessary for growth and rapid reproduction, except in the presence of large amounts of oxygen. In the absence of oxygen, yeast functions in an entirely different manner, serving as a true agent of fermentation, with a very small degree of cell reproduction.

It therefore, follows that at the end of the fermentation process, and after the fermentable sugars have all been transformed into alcohol and carbonic acid gas, a very large percentage of the original nitrogen matter and mineral salts still remain in the residue or slop, and this slop, if properly treated, is capable of forming a constituent of a nutrient medium for the propagation of yeast.

However, the contents of this original slop and especially the nitrogenous matter is of a more or less complex composition and not easily available for yeast growth, without preliminary treatment to reduce the same to a mass having constituents of a less complex composition.

The slop is to be used in conjunction with a yeast mash formula made up of beet or cane molasses, malt, and malt sprouts.

By actual tests, from a given amount of raw materials, (malt, malt sprouts and molasses) used in conjunction with slop, a quantity of final compressed yeast was obtained which was greater by approximately 20% than the amount which was obtained from the same given amount of raw materials without the use of slop.

The introduction of the slop into the regular mash formula of grain and molasses is accomplished as follows: The total amount of malt to be used is mashed and converted in water, by the usual method, using only a small amount of water, or the minimum amount which can be employed to produce the condition necessary for complete conversion of the malt mash. After conversion is completed, this mash is cooled to a proper temperature of from 128° to 130° F. and a pure culture of lactic acid bacteria is introduced into the mash, the amount of the bacteria to be added, depending to some extent upon the total quantity of raw materials to be soured, as is well known in the art. The mash is held at this temperature of 128° to 130° F., for several hours, (from 3 to 6 hours) until the action of the bacteria has gotten well started and lactic acid is being formed. At this point, the mash is very thick and heavy as only enough water has been added to allow the necessary reactions for complete conversion of the starch and protein of the mash.

The next step in the process is to introduce the waste slop into the souring malt mash, and as dilution proceeds, malt sprouts are gradually added until all of the sprouts have been introduced. As the waste slop is usually added hot, just as it is discharged from the beer still, the mash must be continually cooled to maintain the same at the proper souring temperature of from 128° to 130° F.

About one-half of the total amount of slop to be used in the complete mash, is added to the malt and sprout mash at this point, and the whole mixture is allowed to sour for the balance of the first 24 hours, with the occasional addition of aqua ammonia as the acidification proceeds. The action of the bacteria becomes greatly retarded when the maximum point of acidity is reached, this point, shown by tests, to be that which requires between 40 to 60 c. c. of $\frac{1}{10}$ normal alkali solution to neutralize 40 c. c. of the mash. Therefore, the ammonia is added to keep this acid level considerably below this maximum point, as, for example, between the limits of acidity requiring from 10 to 20 c. c. of the $\frac{1}{10}$ normal alkali to neutralize 40 c. c. of the mash.

In the meantime, in another vat, the beet molasses to be used is treated separately. Instead of using water to dilute the heavy beet molasses, I use the remaining one-half part of the waste slop. The resultant mixture is rendered slightly acid by the addition of sulphuric acid and heated by direct contact with steam to almost a boiling temperature, between 90° to 95° C. Instead of using beet molasses, I may use cane molasses, which would be clarified by the method well known in the distillery art.

The phosphate present in the added slop will produce a precipitation of the albuminous matter. The mash is allowed to set for a suitable length of time, such as over night, so that the precipitates will settle to the bottom of the mixture and the mixture is clarified.

After the precipitated matter has thus settled to the bottom, the mixture is clear. The clear liquid is drawn off, leaving the solids at the bottom.

The clear liquid thus produced is now introduced into the souring grain mash, previously prepared, and fresh culture of lactic acid bacteria is now introduced into the resultant mash, which is allowed to continue to sour for 24 hours more, with the continued addition of aqua ammonia, at intervals, as acidity develops, to keep the acid level between the limits of 10 to 20 c. c. of the $\frac{1}{10}$ normal alkali solution required to neutralize 40 c. c. of the mash. While it is preferred to use aqua ammonia as the alkaline neutralizing agent, yet I may employ other alkaline neutralizing agents, such as lime (CaO) or like substances, with some degree of success. When the souring has proceeded for a sufficient length of time to produce the desired changes in the composition of the mash, ordinarily from 36 to 48 hours, the addition of the alkaline neutralizing agent is discontinued and the amount of acidity required in the completed mash is allowed to accumulate. The final degree of acidity must necessarily depend upon the particular process of yeast cultivation to be employed from this point on. The acidity is determined by the usual method of titration with $\frac{1}{10}$ normal alkali solution on a measured quantity (40 c. c.) of the mash, using specially prepared litmus paper as indicator.

The resultant mash is now sterilized and filtered for separation of the soluble extracted matter from the insoluble grain residues, and the liquid mash is next filter-pressed for more complete clarification by the removal of all finely divided insoluble matter, which is precipitated from the waste slop.

Considering malt, sprouts, and molasses as constituting 100 percent of the regular mash formula, I, preferably, employ 20 parts by weight of malt, 20 parts by weight of sprouts, and 60 parts by weight of molasses, although the proportions may be widely varied. The slop is added in each instance, as a substitute for water, to dilute the mash to a desired gravity. The final mash has a gravity of from 18° to 24° B. This mash contains grain constituents such as the malt and sprouts, these constituents containing easily assimilable nitrogen in the form of amino-acids in an amount sufficient to initiate the lactic acid fermentation, or in other words to supply the lactic acid bacteria during the first part of the process.

During the lactic acid fermentation, described in connection with the grain mash, and also in connection with the combined grain mash and beet molasses mash, the complex protein bodies contained in the slop, as well as those present in the regular mash materials, are split up into nitrogen compounds of much more simple composition and rendered more easily assimilable by the yeast cells, as food. One of the most valuable of the simpler forms of organic nitrogen bodies are the so-called amino-acids. The nitrogen of the amino-acids is easily and readily assimilated by yeast. The composition of the above mash, during the prolonged action of the lactic acid bacteria shows an ever increasing quantity of amino-nitrogen, brought about by the continued breaking down of the more complex proteins. It is, therefore, desirable to prolong the action of the lactic acid bacteria, but the bacteria can only function in the presence of a limited amount of acid, and as the acidity increases, the several reactions incidental to its growth and acid-forming properties are necessarily greatly retarded, and finally completely stopped. In order to obtain the prolonged reactions incidental to the maximum growth of the acid bacteria, the degree of acidity is controlled by the addition of the aqua ammonia, directly to the souring mixture, as explained. Acidity tests are made at intervals and measured amounts of aqua ammonia added. By this procedure, the several chemical and biological changes produced by the acid bacteria are greatly prolonged, resulting in a greatly increased amount of nitrogen matter readily available for rapid assimilation by the growing yeast cells. Particular attention is called to the fact that the aqua ammonia is added to the souring mash, at intervals during the souring period, for the purpose of controlling or regulating the acidity, and thereby prolonging the development or growth of acid bacteria, and all reactions incidental to this growth.

The addition of aqua ammonia to the souring mash is also valuable from another standpoint, as it combines directly with the lactic acid, to produce ammonium lactate, which remains dissolved in the extract of the mash, and, furthermore, increases the amount of nitrogen available for yeast food, during the period of yeast cultivation.

The resultant clear wort, although quite highly colored from the use of the slop, contains only soluble coloring matter which can be readily washed away from the finished yeast and a very good quality of yeast of superior fermenting power, and a very good color obtained. To obtain the best color of the finished product, it is necessary to closely regulate the degree of acidity produced throughout the period of yeast propagation. If the proper concentration of H-ions is maintained during the yeast cultivation period and the same controlled so as to be constant, or nearly so, especially during the latter part of this process, a product of very fine color will result.

The control of the acidity during this very important stage of yeast cultivation is made comparatively simple in connection with the use of the materials as prepared by this process, for the following reason. The addition of aqua ammonia during the prolonged period of souring, and the resultant combination of same with the various organic acids formed, result in an accumulation of chemical substances with the so-called Buffer properties. Namely, these substances restrict and hold within desirable limits the formation of free hydrogen ions or ionizable acid radicals which is very important especially during the latter stages of yeast propagation. In this case, it is possible to maintain the pH concentration at practically a constant level with the addition of small quantities of mineral salts and with the entire elimination of any neutralizing agents during the entire period of yeast cultivation.

While I have described a process in which aqua ammonia is added to the mash containing waste slop, during the souring stage, for regulating the acidity, yet, the invention is not necessarily restricted to the treatment of a mash containing the waste slop, as I contemplate treating yeast mash free from the added waste slop, during the souring period, for controlling or regulating the acidity.

It is to be understood that the form of my invention herewith shown and described, is to be taken as a preferred example of the same, and that various changes in the order of the steps of the method may be resorted to, and equivalents employed, without departing from the spirit of my invention or the scope of the subjoined claims.

Having thus described my invention, what I claim is:

1. The herein described process of treating waste distillery slop to render the same available as a constituent of the nutrient medium for the propagation of commercial compressed yeast, comprising combining the slop with a yeast mash including grain constituents containing easily assimilable nitrogen in an amount sufficient to initiate lactic acid fermentation, adding to the mass thus obtained lactic acid bacteria to effect souring of the same, regulating the degree of acidity of the mass by the addition of aqua ammonia so that the lactic acid bacteria are propagated for a prolonged period and the constituents of the slop thereby rendered available as a nutrient for yeast, sterilizing the resultant mass, and filtering for removing foreign solid matter.

2. The herein described process of treating waste distillery slop to render the same available as a constituent of the nutrient medium for the propagation of commercial compressed yeast, comprising combining the slop with a yeast mash including grain constituents containing easily assimilable nitrogen in an amount sufficient to initiate lactic acid fermentation, adding to the mass thus obtained lactic acid bacteria to effect souring of the same, regulating the degree of acidity of the mass by the addition of an alkaline neutralizing agent so that the lactic acid bacteria are propagated for a prolonged period and the contents of the slop thereby rendered available as a nutrient for yeast, sterilizing the resultant mass, and filtering the same for removing foreign solid matter.

3. In the herein described process of treating waste distillery slop to render the same available as a constituent of the nutrient medium for the propagation of commercial compressed yeast, the steps of combining the slop with a yeast mash including grain constituents containing easily assimilable nitrogen in an amount sufficient to initiate lactic acid fermentation, adding to the mass thus obtained lactic acid bacteria to effect souring of the same, and regulating the degree of acidity of the mass by the addition of an alkaline neutralizing agent so that the lactic acid bacteria are propagated for a prolonged period and the contents of the slop thereby rendered available as a nutrient for yeast.

4. The method of producing a nutrient medium for the propagation of commercial compressed yeast, comprising combining waste distillery slop with a yeast mash including grain constituents containing easily assimilable nitrogen in an amount sufficient to initiate lactic acid fermentation adding to the mass lactic acid bacteria to effect a souring of the same, regulating the degree of acidity of the mass by the addition of an alkaline neutralizing agent so that the lactic acid bacteria are propagated for a prolonged period, sterilizing the mash, and filtering the same.

5. The herein described process of treating waste distillery slop to render the same available as a constituent of the nutrient medium for the propagation of commercial compressed yeast, comprising combining a portion of the slop with a grain mash, adding lactic acid bacteria to the resultant mass to effect a souring of the same, controlling the degree of acidity of the mass by adding thereto an alkaline neutralizing agent so that the lactic acid bacteria are propagated for a prolonged period and the constituents of the slop thereby rendered available as a nutrient for yeast, adding a portion of the slop to a molasses and treating the same for producing a clarified liquid mass, combining the clarified liquid mass with the mass first produced for obtaining a resultant liquid mass, adding additional lactic acid bacteria to the resultant mass for effecting a further souring of the same, regulating the degree of acidity of such resultant mass by the addition of an alkaline neutralizing agent so that the lactic acid bacteria are propagated for a prolonged period and the contents of the slop rendered available as a nutrient for yeast, sterilizing the resultant mass, and filtering.

6. The herein described process of treating waste distillery slop to render the same available as a constituent of the nutrient medium for the propagation of commercial compressed yeast, comprising combining a portion of the slop with a grain yeast mash, adding lactic acid bacteria to the resultant mass to effect a souring of the same, controlling the degree of acidity of the mass by adding thereto aqua ammonia so that the lactic acid bacteria are propagated for a prolonged period and the constituents of the slop thereby rendered available as a nutrient for yeast, adding a portion of the slop to beet molasses to dilute the same for providing a second liquid mass, rendering the second liquid mass slightly acid, heating the second liquid mass thus treated and separating the liquid constituent from the solid constituents, combining the liquid constituent of the second mass with the first mass, adding additional lactic acid bacteria to the resultant mass, for effecting a souring of the same, controlling the degree of acidity of the resultant mass by adding thereto aqua ammonia so that the lactic acid bacteria are propagated for a prolonged period and the constituents of the slop thereby rendered available as a nutrient for yeast, sterilizing the resultant mass, and filtering.

7. The herein described process of treating waste distillery slop to render the same available as a constituent of a nutrient medium for the propagation of commercial compressed yeast, comprising the steps of adding lactic acid bacteria to a grain yeast mash and effecting the propagation of such bacteria within the mash, adding the slop to such mash so that the propagation of the lactic acid bacteria continues and the resultant mass is soured, and regulating the acidity of the mass by the addition thereto of aqua ammonia so that the propagation of the lactic acid bacteria is continued for a prolonged period and the constituents of the slop are rendered available as a nutrient for yeast.

HAROLD L. KING